United States Patent
Botosan et al.

(10) Patent No.: US 7,182,562 B2
(45) Date of Patent: Feb. 27, 2007

(54) GEAR BOLT RETENTION IN AN AUTOMATIC TRANSMISSION ASSEMBLY SUBJECTED TO THRUST AND BENDING LOADING

(75) Inventors: Valentin Botosan, Rochester, MI (US); Berthold Martin, Shelby Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 276 days.

(21) Appl. No.: 10/765,257

(22) Filed: Jan. 26, 2004

(65) Prior Publication Data

US 2005/0120821 A1    Jun. 9, 2005

Related U.S. Application Data

(60) Provisional application No. 60/526,853, filed on Dec. 4, 2003.

(51) Int. Cl.
*F16B 39/20* (2006.01)

(52) U.S. Cl. .................... 411/122; 411/88; 411/120

(58) Field of Classification Search ............ 411/122, 411/102, 120, 353, 123, 88–96; 74/493, 74/395, 434, 405; 403/315
See application file for complete search history.

(56) References Cited

U.S. PATENT DOCUMENTS

| | | | | |
|---|---|---|---|---|
| 1,657,949 A * | 1/1928 | Wilson | ......................... | 411/123 |
| 2,128,429 A * | 8/1938 | Olson | ......................... | 411/123 |
| 4,505,628 A * | 3/1985 | Meibuhr | ..................... | 411/123 |
| 4,737,057 A * | 4/1988 | Olsson | ........................ | 411/92 |
| 5,415,509 A * | 5/1995 | Martin et al. | ................ | 411/123 |
| 5,639,113 A * | 6/1997 | Goss et al. | .............. | 280/728.2 |
| 5,855,052 A * | 1/1999 | Becker et al. | ................. | 29/464 |
| 6,053,680 A * | 4/2000 | Menke | ......................... | 411/178 |
| 6,224,167 B1* | 5/2001 | Riley | ........................ | 301/126 |

* cited by examiner

*Primary Examiner*—Richard Ridley
*Assistant Examiner*—James Pilkington
(74) *Attorney, Agent, or Firm*—Thomas A. Jurecko

(57) ABSTRACT

A bolt lock locks a bolt against rotation on an output gear. The bolt lock includes a locking plate having a ring-shaped body encircling the head of the bolt and provided with locking tabs bendable into locking engagement with the flat sides of the bolt head to prevent the bolt from rotating. The plate is secured to the output gear by additional bolts. The ring-shaped body has additional locking tabs bendable into locking engagement with the flat sides of the heads of the additional bolts.

3 Claims, 2 Drawing Sheets

GEAR BOLT RETENTION IN AN AUTOMATIC TRANSMISSION ASSEMBLY SUBJECTED TO THRUST AND BENDING LOADING

This application claims the benefit of U.S. Provisional Application Ser. No. 60/526,853, filed Dec. 4, 2003.

This invention relates to a bolt lock for locking a bolt against rotation.

BACKGROUND OF THE INVENTION

In a typical vehicle transmission, an output gear is splined on a hub. The output gear is clamped in a desired position on the hub by a bolt. However, in time the bolt will loosen if it is not prevented from rotating. When the bolt loosens, the output gear can shift away from its desired position. What is needed is a simple, effective means to prevent the bolt from rotating.

SUMMARY OF THE INVENTION

In accordance with the present invention, a bolt lock is provided for locking a bolt against rotation relative to a base member such, for example, as an output gear in the transmission of an automotive vehicle. The bolt lock comprises a locking plate having at least one flexible, bendable locking tab adjacent to the bolt. The locking tab is bendable into locking engagement with the bolt to prevent the bolt from rotating.

In a preferred form of the invention, the locking plate has an annular, ring-shaped body adapted to be secured to the output gear in encircling relation to the head of the bolt. The bolt head is polygonal, having flat sides. The ring-shaped body has flexible, bendable locking tabs adjacent to the bolt head which are bendable into locking engagement with the sides of the bolt head.

Further in accordance with the invention, the ring-shaped body has radially outward extensions provided with one or more additional flexible, bendable locking tabs which engage the heads of additional bolts used to secure the ring-shaped body to the output gear.

One object of this invention is to provide a bolt lock having the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
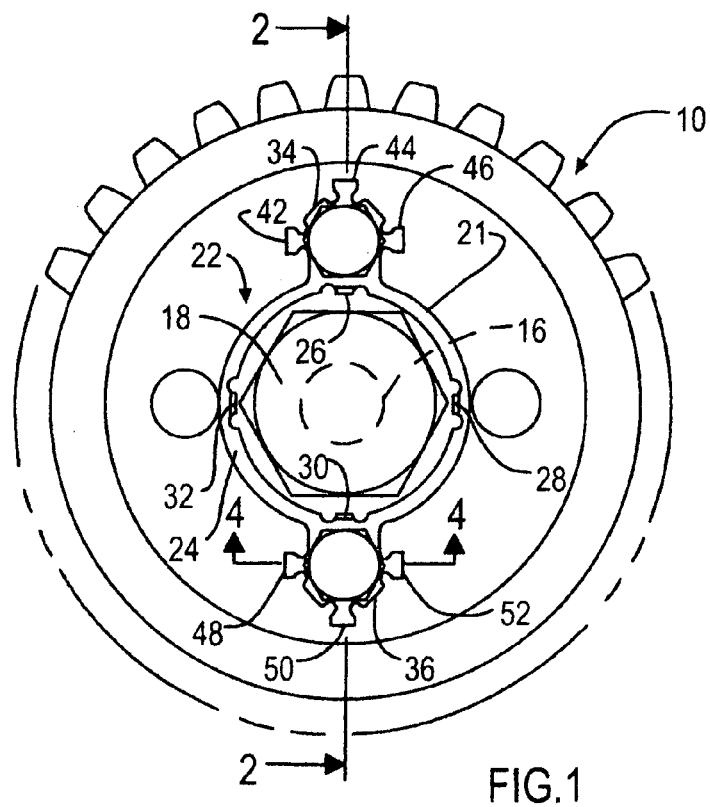
FIG. 1 is an end elevational view showing an output gear mounted on a hub (not shown in this figure) by a bolt, with a bolt lock comprising a locking plate including a ring-shaped body encircling the head of the bolt. The locking plate has flexible, bendable locking tabs adapted to engage the head of the bolt to prevent the bolt from rotating. The locking plate is secured to the output gear by additional bolts which are also adapted to be prevented from rotating by flexible, bendable locking tabs on extensions of the ring-shaped body.

The following description of the preferred embodiment is merely exemplary in nature and is in no way intended to limit the invention, its application or uses.

Referring more particularly to the drawings, there is shown a base member, which is shown in the form of an output gear 10, splined on a rotary member, which is shown in the form of a tubular hub 12. The output gear 10 and hub 12 are parts of an automotive vehicle transmission. The hub 12 extends into a center hole 14 in the gear 10. A bolt 16 is threaded into the hub 12. The head 18 of the bolt 16 is on the outer side of the output gear 10, aligned with the hole 14. The bolt head 18 is polygonal, preferably having six flat sides equally circumferentially spaced 60° apart. A washer 19 surrounds the shank of the bolt 16 and is compressed between the bolt head 18 and the output gear 10 when the bolt 16 is tightened, to clamp the output gear 10 against a locating shoulder 20 on the hub 12 in a desired axial position on the hub 12.

A bolt lock 21 is secured to the outer side of the gear 10. The bolt lock 21 is preferably a metal stamping of integral, one-piece construction and comprises a locking plate 22 having an annular, ring-shaped body 24 which encircles the bolt head 18.

The ring-shaped body 24 has a plurality of flexible, bendable locking tabs 26, 28, 30 and 32 equally circumferentially spaced 90° apart along the radially inner edge of the ring-shaped body 24.

The ring-shaped body 24 has a pair of integral, radially outward extensions 34 and 36 spaced 180° apart on opposite sides thereof. The extensions 34 and 36 are in the plane of the body 24 and have center holes 38 and 40. Flexible, bendable locking tabs 42, 44 and 46 project radially outwardly from the extension 34, spaced 90° apart. Flexible, bendable locking tabs 48, 50 and 52 project radially outwardly from the extension 36 spaced 90° apart.

A bolt 60 extends through the hole 38 in the extension 34 and a bolt 62 extends through the hole 40 in the extension 36. The bolts 60 and 62 thread into holes 64 and 66 in the output gear 10 and the heads 68 and 70 of the bolts 60 and 62 clamp the locking plate 22 to the output gear 10. The heads 68 and 70 of the bolts 60 and 62 are polygonal, and, like the bolt 16, preferably have six flat sides equally circumferentially spaced 60° apart.

Figure 2:
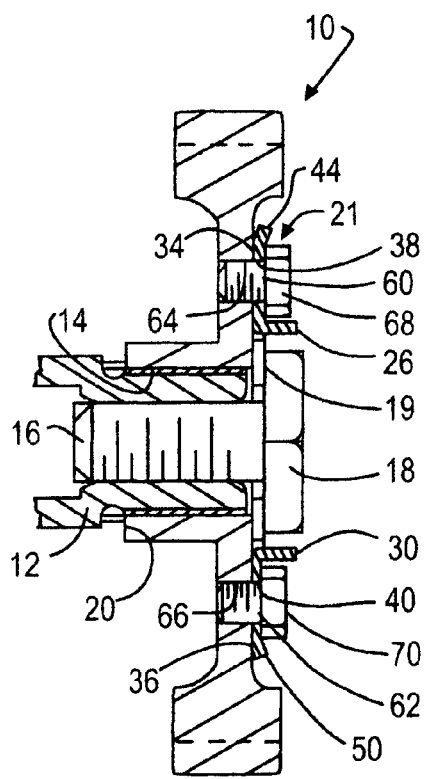
FIG. 2 is a sectional view taken on the line 2—2 in FIG. 1 showing the position the flexible locking tabs before any of them are bent into locking engagement with the bolts.
Figure 5:
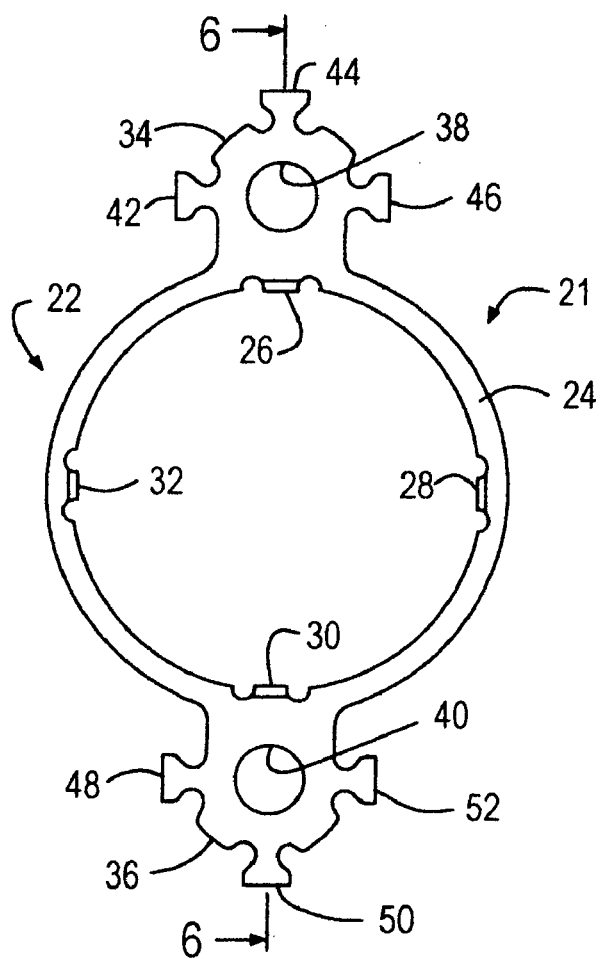
FIG. 5 is an elevational view of the locking plate before the locking tabs have been bent into locking positions.
Figure 6:
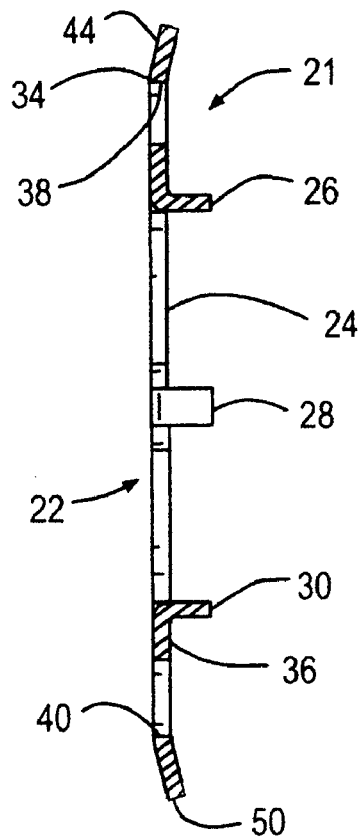
FIG. 6 is a sectional view taken on the line 6—6 in FIG. 5.

FIGS. 5 and 6 show the locking plate 22 before any of the locking tabs 26, 28, 30, 32, 42, 44, 46, 48, 50 and 52 have been bent from a retracted position into a locking position. In this condition, the locking tabs 26, 28, 30 and 32 extend outwardly from the flat plane of the body 24, and the locking tabs 42, 44, 46, 48, 50 and 52 extend at a small angle to the body 24 and the extensions 34 and 36. FIG. 2 shows the locking plate 22 secured to the output gear 10 in this same condition, that is, with the locking tabs retracted.

Figure 3:
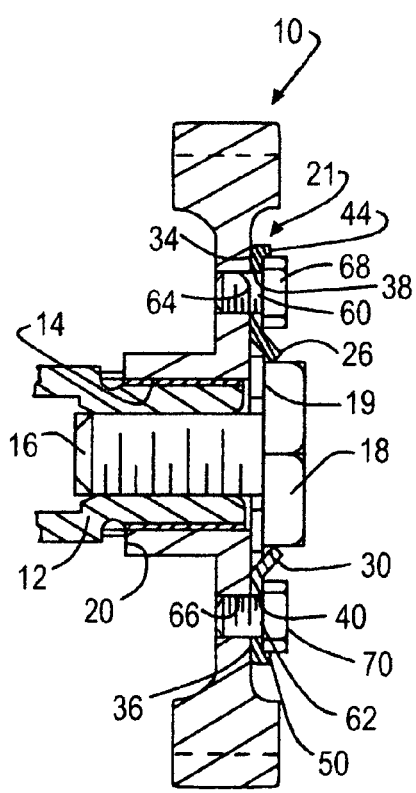
FIG. 3 is a sectional view similar to FIG. 2, but showing selected locking tabs after they have been bent into locking engagement with the bolts.
Figure 4:
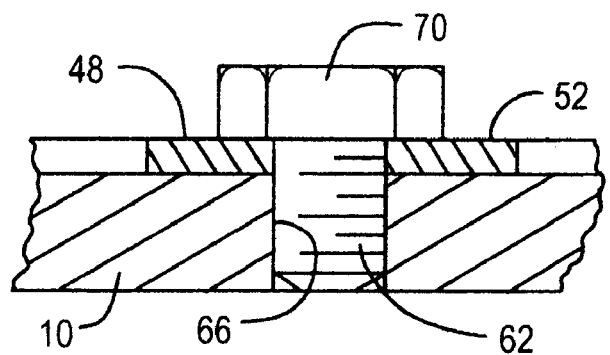
FIG. 4 is a sectional view taken on the line 4—4 in FIG. 1.

In use, and with the output gear 10 splined on the hub 12, the bolt 16 is threaded into the hub 12 and tightened, compressing the washer 19 between the bolt head 18 and the output gear 10 and clamping the output gear 10 against the shoulder 20 of the hub 12 so that the output gear cannot slip axially on the hub. The locking plate 22 is placed flat against the outer side of the output gear 10 as shown in FIG. 2. The bolts 60 and 62 are inserted into the holes 38 and 40 of the extensions 34 and 36 and are threaded into the holes 64 and 66 in the output gear 10 and tightened to clamp the locking plate 22 to the output gear 10, with the body 24 and extensions 34 and 36 flat against the outer surface of the output gear 10. Then one or more of the tabs 26, 28, 30 and 32 are bent from the retracted position shown in FIG. 2 to the locking position of FIG. 3 against the bolt head 18 so that the bolt 16 cannot rotate. Usually at least two of such tabs are bent to the locking position of FIG. 3 against the bolt head, and preferably the two selected are on opposite sides of the bolt head 18 and lockingly engage opposite flat sides on the bolt head.

One or more of the tabs 40, 42, and 46 are bent into engagement with the head 68 of the bolt 60 and one or more of the tabs 48, 50 and 52 are bent into engagement with the head 70 of the bolt 62 so that the bolts 60 and 62 cannot rotate.

While preferably the tabs engage flats on the associated bolt heads, they may also engage the corners between the flats. The tabs when in the locking position prevent the bolts from rotating so that the bolts do not come loose.

The description of the invention is merely exemplary in nature, and, thus variations that do not depart from the gist of the invention are intended to be within the scope of the invention. Such variations are not to be regarded as a departure from the spirit and scope of the invention.

What is claimed is:

1. A bolt lock for preventing rotation of a bolt relative to a workpiece comprising:

a locking plate having a ring-shaped body, a first extension extending outward from said ring-shaped body, and a second extension extending outward from said ring-shaped body;

wherein said ring-shaped body includes a first plurality of bendable locking tabs, said first extension includes a second plurality of bendable locking tabs, and said second extension includes a third plurality of bendable locking tabs, wherein said first plurality of bendable locking tabs are movable between an engaged position contacting a head of said bolt and a disengaged position retracted from said head of said bolt, wherein said second plurality of bendable locking tabs are movable between an engaged position contacting a second head of a second bolt, used for securing the locking plate to the workpiece, to prevent rotation of the second bolt, and a disengaged position removed from said second head of said second bolt, and wherein said third plurality of bendable locking tabs are movable between an engaged position contacting a third head of a third bolt, used for securing the locking plate to the workpiece, to prevent rotation of the third bolt, and a disengaged position removed from said third head of said third bolt.

2. The bolt lock of claim 1, wherein said ring-shaped body, said first extension, and said second extension are formed of a single piece of material.

3. The bolt lock of claim 2, wherein said second plurality of bendable locking tabs project radially outwardly from said first extension and wherein said third plurality of bendable locking tabs project radially outwardly from said second extension.

* * * * *